Patented June 29, 1954

2,682,474

UNITED STATES PATENT OFFICE 2,682,474

PROPENYL DERIVATIVES OF ALKOXY-PHENOLS AS ANTIOXIDANTS

Alan Bell, M B Knowles, and Clarence E. Tholstrup, Kingsport, Tenn., assignors to Eastman Kodak Company, Rochester, N. Y., a corporation of New Jersey No Drawing. Application May 31, 1951, Serial No. 229,282

19 Claims. (Cl. 99—163)

This invention relates to the stabilization of fats, oils and other organic materials subject to deterioration employing compounds as antioxidants which are believed to have never been heretofore prepared and which are generically termed hereinbelow as propenyl derivatives of p-alkoxyphenols. In our copending application Serial Number 229,281, filed on even date herewith propenyl derivatives of hydroquinone are described as antioxidants.

U. S. Patent 2,310,710 contains a reference to the use of allyl-p-hydroxyanisole as an antioxidant for fats and oils. Propenyl derivatives of p-hydroxyanisole have been described, such as the dimethyl ether of isopropenyl hydroquinone, cf. Kauffman and Beisswenger, Berichte, 38, 792; the dimethyl ether of propenyl hydroquinone, cf. Thomas, Berichte, 36, 858; the dimethyl ether of alpha,beta-dimethyl propenyl hydroquinone, cf. Lauer and Renfrew, J. Am. Chem. Soc., 67, 808–10; and polymers of isopropenyl-p-hydroxyanisole, cf. U. S. Patent No. 2,296,363. The latter patent contains the only known reference to the use of propenyl derivatives of p-alkoxyphenol as antioxidants. The process for preparing the compounds of that patent results in the preparation of polymeric products which are not effective in the stabilization of fats and oils.

We have now found that the monomeric propenyl derivatives of p-alkoxyphenols having the following formula are valuable antioxidants especially for fats and oils:

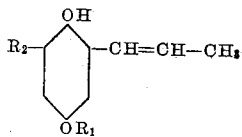

wherein $R_1$ represents a member selected from the group consisting of alkyl radicals containing from 1 to 8 carbon atoms, and wherein $R_2$ represents a member selected from the group consisting of a hydrogen atom, an alkyl radical containing from 1 to 8 carbon atoms, an alkenyl radical containing from 3 to 8 carbon atoms, and an aryl radical of the benzene series containing from 6 to 12 carbon atoms. Examples of such alkyl radicals include methyl, ethyl, propyl, tertiary butyl, hexyl, tertiary octyl, etc. Examples of such alkenyl radicals include allyl, 1-propenyl, isopropenyl, isobutenyl, hexenyl, etc. Examples of such aryl radicals include phenyl, tolyl, xylyl, biphenyl, etc. In other words, exemplary compounds encompassed by the above-defined formula include 4-methoxy-2-(1-propenyl) phenol which is hereinafter referred to as propenyl-p-hydroxyanisole which has the following formula:

I
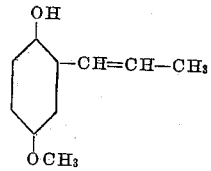

4-methoxy-2,6-di(1-propenyl)-phenol which is hereinafter referred to as dipropenyl-p-hydroxyanisole which has the following formula:

II
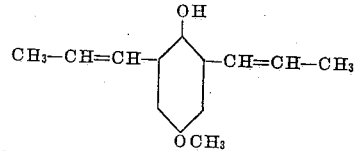

2-t-butyl-4-methoxy-6(1-propenyl) phenol hereinafter referred to as t-butyl-propenyl-p-hydroxyanisole which has the following formula:

III
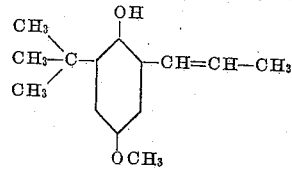

2-allyl-4-methoxy-6(1-propenyl) phenol hereinafter termed allyl-propenyl-p-hydroxyanisole having the following formula:

IV
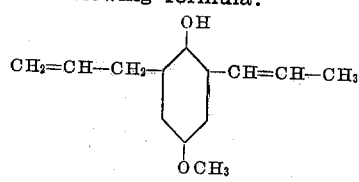

6-methyl-4-methoxy-2(1-propenyl) phenol, 6-tertiary octyl-4-propoxy-2-(1-propenyl)phenol, 6-isopropenyl-4-methoxy-2(1-propenyl) phenol, 6-phenyl-4-methoxy-2(1-propenyl) phenol, 6-biphenyl-4-methoxy-2(1-propenyl) phenol, 6-hexyl-4-tertiary butoxy-2-(1-propenyl) phenol, etc. In addition to the above described compounds wherein a substituent $R_2$ appears in the 6 position on the benzene nucleus, it is also possible to employ related compounds in which the $R_2$ substituent appears in the 3 position; however, such compounds possess inferior antioxidant properties and generally speaking, need not be given further consideration here since the isomer in the 6 position is the most advantageous. Nevertheless, when the method producing the compounds as described above results in some production of compounds which are 3-isomers, it is unnecessary to separate out the 3-isomer inasmuch as it can remain as a less effective constituent in the antioxidant product whose principally effective constituent is the 6-isomer.

In all of the above-defined compounds, the propenyl side chain contains a double bond in conjugated relationship to a double bond in the benzene ring nucleus. This is one of the distinguishing characteristics of the propenyl derivatives of p-alkoxyphenol of this invention and is belived to be in a large measure responsible for their unusual antioxidant properties. In this regard it can be noted that when these compounds are polymerized, the extra-nuclear double bonds disappear in all but the end units of the polymer chain to the consequent detriment of the antioxidant properties of such compounds when in polymeric form. Consequently, we specifically exclude polymers from the scope of our invention. In this regard, reference is made to the copending application mentioned above covering propenyl derivatives of hydroquinone for a discussion as to the disadvantageous nature of polymers insofar as their effectiveness as antioxidants is concerned. As between 2(1-propenyl)-4-methoxy-phenol and 2-isopropenyl-4-methoxyphenol, the latter compound polymerizes very readily and it is difficult to prepare the isopropenyl compound without its spontaneous polymerization. On the other hand, the 1-propenyl compound is quite stable; in fact, a sample heated to 200° C. for two hours did not discolor and the heat treatment did not decrease to any significant extent its antioxidant potency. This difference between the 1-propenyl and the isopropenyl compounds was quite unobvious and further illustrates the advantages of the former over the latter.

The discovery that the existence of improved antioxidant properties results from the above-described conjugated double bond relationship is unexpected inasmuch as the antioxidant property function of the nuclear substituents of p-alkoxyphenols is but little understood. In this regard it can be noted that the protection factor (defined hereinbelow) of 2-allyl-4-methoxyphenol in lard at a concentration of 0.02% was determined in a certain test to be 2.2 whereas the corresponding protection factor of 2-propenyl-4-methoxyphenol was found to be 7.8 under the same conditions. This is unexpected when considered in view of the protection factors in lard at a concentration of 0.02% of the corresponding catechol derivatives, viz. 2-allyl-6-methoxyphenol(factor of about 1.0) and 2-propenyl-6-methoxyphenol (factor of about 1.2) inasmuch as these catechol derivatives have factors of approximately the same magnitude whereas the hydroquinone derivatives of this invention show a marked superiority of the factor for the propenyl over the allyl derivative (see the tabulation of data given below).

It is an object of our invention to provide novel antioxidants possessing improved properties which are particularly useful in the stabilization of fats and oils. Another object is to provide such antioxidants which are insoluble in aqueous media but which are soluble in fats, oils, petroleum solvents and other organic compounds whereby such antioxidants have improved carry-over properties when a fat or oil stabilized therewith is employed in preparing cooked foods. Other objects are apparent elsewhere herein.

The propenyl derivatives of p-alkoxyphenols which have been specifically set forth above can be prepared as illustrated by the following examples wherein all parts are by weight:

Example 1 describes the preparation of the starting material used in the preparation of propenyl-p-hydroxyanisole.

EXAMPLE 1

*2-allyl-4-methoxyphenol*

A mixture of 120 grams (2.0 mols) of 85 percent potassium hydroxide, 248 grams (2.0 mols) of 4-methoxyphenol, 153 grams (2.0 mols) of allyl chloride, 400 ml. of water, and 400 ml. of acetone was refluxed for five hours. The resulting mixture was cooled to 30° C. and 200 ml. of hexane was added. Two layers were formed which were separated and the nonaqueous organic layer was washed twice with water and then dried over calcium chloride. This resulting residue was then mixed with 300 ml. of diethylaniline and heated at 190–210° C. for four hours, allowing the hexane to distill off. The residue was then allowed to cool and was mixed with 300 ml. of hexane and extracted twice with 400 ml. portions of a 10 percent sodium hydroxide solution. The extract which was obtained was acidified with hydrochloric acid resulting in the formation of an oily layer which was then separated, dried over calcium chloride, and then distilled under greatly reduced pressure. A yield of 196 grams (60 percent) of 2-allyl-4-methoxy phenol was obtained which had a boiling point of 101–104° C. at a pressure of 3 mm. of Hg.

Example 2 describes how 2-allyl-4-methoxyphenol can be used to prepare propenyl-p-hydroxyanisole (see Formula I above).

EXAMPLE 2

*Propenyl-p-hydroxyanisole*

A mixture of 82 grams (0.5 mol) of 2-allyl-4-methoxyphenol, 164 grams (2.9 mols) of potassium hydroxide, and 82 grams of water was heated with stirring and under a nitrogen atmosphere at 170° C. for one hour. After cooling the reaction mixture, 800 ml. of water was added and the resulting solution was then acidified with hydrochloric acid. The oily layer which formed upon the acidification was dried over calcium chloride and then distilled under greatly reduced pressure. A yield of 63 grams (77 percent) of 4-methoxy-2-(1-propenyl) phenol (propenyl-p-hydroxyanisole) was obtained which had a boiling point at 110–114° C. at 3 mm. of Hg pressure.

Example 3 describes how diallyl-p-hydroxyanisole (2,6-diallyl-4-methoxyphenol) can be prepared, this product being useful in the preparation of dipropenyl-p-hydroxyanisole as described in Example 4.

EXAMPLE 3

*Diallyl-p-hydroxyanisole*

A solution of 164 grams of 2-allyl-4-methoxy phenol, 500 ml. of methanol, 50 grams of sodium hydroxide, 100 ml. of water, and 110 grams of allyl chloride was refluxed for four hours. The reaction mixture which formed was cooled, diluted with two liters of water, and then extracted with diethyl ether. The extract was washed with a dilute sodium hydroxide solution and then with water. After drying the extract with calcium chloride, 100 ml. of dimethylaniline was added and the ether removed by distillation. The residue was then heated at 215–220° C. for one hour. After cooling, an equal volume of hexane was added and the resulting solution was extracted first with dilute sodium hydroxide solution and then with dilute hydrochloric acid solution. The treated hexane solution was then dried over calcium chloride and the solvent, viz. hexane, was removed. The resulting residue was distilled to give a 70 percent yield of 2,6-diallyl-4-methoxy phenol (diallyl-p-hydroxyanisole).

The preparation of diallyl-p-hydroxyanisole, in the above example, can be carried out without the employment of dimethylaniline which was used as an aid in effecting the rearrangement of the allyl ether which formed. When the employment of dimethylaniline is omitted, the rearrangement can be made to take place merely by heating at a temperature of 180–250° C. for about one hour.

Examples 4A and 4B describe how diallyl-p-hydroxyanisole can be used in the preparation of dipropenyl-p-hydroxyanisole (see Formula II above).

EXAMPLE 4A

*Dipropenyl-p-hydroxyanisole*

34 grams of 2,6-diallyl-4-methoxyphenol and 93 grams of a 70 percent aqueous solution of potassium hydroxide were mixed together and heated at a temperature of 170° C. for one hour. The reaction mixture was cooled and then poured into water and the oil which separated was extracted with diethyl ether. The ether was evaporated, leaving a crude mixture which represented an almost quantitative yield. This crude product can be purified by recrystallization to give a reduced yield of 4-methoxy-2,6-di-(1-propenyl) phenol (dipropenyl-p-hydroxyanisole). Thus, the crude product was recrystallized three times employing hexane as a solvent whereby the yield was reduced to 50% of the pure compound which had a melting point of 98–99° C.

However, this purification is as a practical matter entirely unnecessary since the crude product can be advantageously employed as an antioxidant for fats and oils. The impurity which is an oil contains both propenyl and allyl groups and is probably a mixture of dipropenyl, diallyl, allyl propenyl, and cis and trans isomers of these compounds.

The isomerization which takes place as described in Examples 4A and 4B can also be carried out employing a 70 percent solution of sodium hydroxide instead of the potassium hydroxide solution.

Similarly, the isomerization described in Example 4A can be carried out at a lower temperature as follows:

EXAMPLE 4B

*Dipropenyl-p-hydroxyanisole*

A mixture of 200 g. of 85 percent potassium hydroxide, 80 cc. of water, and 10 cc. of triethanolamine was stirred and heated to 115° C. Then 240 g. of 2,6-diallyl-4-methoxyphenol was added and the mixture heated at 114–119° C. for one hour under an atmosphere of nitrogen. The reaction mixture was poured onto 500 g. crushed ice and acidified with hydrochloric acid. The organic layer was extracted with ether, washed, dried over $CaCl_2$, and the solvent removed to give 230 g. of a white semi-solid, which is a crude mixture which can be used as such in stabilization of fats and oils. This crude product was taken up in hot hexane, which, on cooling, deposited 121 g. (51 per cent) of 4-methoxy-2,6-dipropenylphenol which melted at 98–98.5° C. after recrystallizing from hexane. The hexane was evaporated and 500 cc. of pentane added and the solution cooled to −30° C. when 26 g. (11 per cent) more of the 4-methoxy-2,6-dipropenylphenol was obtained. Evaporation of the pentane left a yellow colored oil (81 g.) which was distilled at 80–85° C. (0.5 mm.). The resulting yellow oil was a very effective antioxidant for fats and vegetable oils. An infrared study indicated that it contained both allyl and propenyl groups. Reduction of the oil with palladium on charcoal gave a solid, M. P. 28–30° C. A mixed melting point indicated that this product was indentical to 2,6-di-n-propyl-4-methoxyphenol.

The following table gives the comparable antioxidant data on the above three products tested in lard (the symbol P. F. represents protection factor which is defined hereinbelow).

| Compound | Percent Antioxidant | P. F. |
|---|---|---|
| Control | | 1.0 |
| Crude reaction product | .01 | 4.1 |
| | .02 | 5.1 |
| Pure 2,6-dipropenyl-4-methoxyphenol | .01 | 4.2 |
| | .02 | 5.3 |
| Distilled oil | .01 | 3.7 |
| | .02 | 4.9 |

This data clearly indicates the advantage of using the crude product which was obtained in practically quantitative yield from isomerization of 2,6-diallyl-4-methoxyphenol. The crude product also has better physical properties than the pure 2,6-dipropenyl-4-methoxyphenol, since it is a mixture of an oil and a solid.

Examples 5 and 6 describe how t-butyl-propenyl-p-hydroxyanisole (see Formula III) can be prepared employing the product of Example 5 as the starting material.

EXAMPLE 5

*6-allyl-2-t-butyl-4-methoxphenol*

A mixture consisting of 53 parts of 2-t-butyl-4-methoxyphenol, 250 parts methanol, 40 parts sodium hydroxide, 50 parts water, and 76.5 parts allyl chloride was refluxed for three hours. After cooling, the mixture was diluted with an equal volume of water and then extracted with pentane. The pentane extract was washed with water, Claisen's alkali solution, then with water again, dried over calcium chloride, and the solvent removed. The residual oil which consisted essentially of the allyl ether was mixed with an equal volume of diethylaniline and heated at 235° C. for one hour. The solution was cooled, diluted with hexane and extracted with dilute hydrochloric acid to remove the diethylaniline. The treated solution was then extracted with 110 parts of Claisen's alkali solution. The resultant alkaline solution was then washed with pentane, after which it was diluted with water and then acidified. The organic layer which formed was taken up in pentane, dried and then distilled to give 36 parts of 6-allyl-2-t-butyl-4-methoxyphenol which had a boiling point of 115–118° C. under 1.0 mm. of Hg pressure.

EXAMPLE 6

*t-Butyl-propenyl-p-hydroxyanisole*

The product of Example 5 was isomerized by heating 25 parts thereof with 20 parts of potassium hydroxide and 100 parts of ethylene glycol at 150° C. for one hour. The cooled mixture was poured into ice water, acidified, extracted with pentane and then distilled at 113–119° C. under a pressure of 0.7 mm. of Hg pressure. The product obtained consisted essentially of 2-t-butyl-4- methoxy-6-(1-propenyl) phenol (see Formula III above).

A series of similar reactions to those described in Examples 5 and 6 were carried out starting with 50 parts of 3-t-butyl-4-methoxy-phenol with the resultant preparation of a mixture of products consisting of 3-t-butyl-4-methoxy-2-(1-propenyl) phenol and 3-t-butyl-4-methoxy-6-(1-propenyl) phenol. These products which are isomers of the compounds defined in the generic formula set forth hereinabove can be employed as antioxidants but cannot be as advantageously employed in that regard as the compounds defined in the generic formula wherein the substituents of p-hydroxyanisole are located in the 2 and 6 positions with respect to the phenolic hydroxy radical.

In addition to the employment of 2-t-butyl-4-methoxyphenol as described in Example 5, it is also possible to employ a mixture of that compound with its isomer, viz. 3-t-butyl-4-methoxyphenol. Such a mixture is available commercially and can be treated by a series of reactions similar to those described in Examples 5 and 6.

EXAMPLE 7

A mixture containing 77.8 percent of the 2-t-butyl isomer and 18.9 percent of the 3-t-butyl isomer of t-butyl-4-methoxyphenol in a quantity amounting to 53 parts was mixed with methanol, sodium hydroxide, water and allyl chloride in exactly the same quantities as described in Example 5 and was refluxed for three hours after which the subsequent treatments were performed upon the resulting reaction mixture as described in Examples 5 and 6 whereby approximately 42 parts of a product was obtained which distilled at 93–100° C. under 0.4 mm. of Hg pressure. This product was, of course, a mixture but the main constituent was 2-t-butyl-4-methoxy-6-(1-propenyl) phenol (t-butyl-propenyl-p-hydroxyanisole).

Similar products may be obtained employing various other mixtures of the isomers of t-butyl-4-methoxy phenol.

EXAMPLE 8

*Allyl-propenyl-p-hydroxyanisole*

A molecularly equivalent quantity of 4-methoxy-2-1-propenyl) phenol was substituted in place of the 53 parts of 2-t-butyl-4-methoxyphenol employed in accordance with the procedure set forth in Example 5. The product obtained was 2-allyl - 4 - methoxy-6 - (1 - propenyl) phenol (allyl-propenyl-p-hydroxyanisole) which distilled at 125–135° C. under 0.8 mm. of Hg pressure.

It is believed quite clear that various modifications of the above examples could be employed by those skilled in the art to produce similar results such as by substituting an equivalent hydrocarbon solvent such as pentane for the hexane employed in several of the above examples, employing other alkaline solutions such as sodium hydroxide for potassium hydroxide, making minor changes in the proportions of the reactants, employing various other solvents or diluents in place of methanol such as ethanol or propanol or in place of diethyl ether such as methyl ethyl ether, methyl propyl ether or acetone, etc., omitting diethylaniline entirely or employing dimethylaniline in its place, employing other acids than hydrochloric acid for neutralization purposes, using other inert atmospheres than nitrogen gas, etc.

The above examples make it evident that the propenyl derivatives of p-alkoxyphenols can be prepared by isomerizing the allyl analogues of these compounds by heating in the presence of an alkali metal hydroxide solution in water or other inert polar medium such as ethylene glycol under an inert atmosphere at an elevated temperature followed by cooling, neutralization and separation of the product which can be further purified by any suitable means such as by distillation at a greatly reduced pressure or by recrystallization from an inert solvent such as hexane. Temperatures which can be advantageously employed during the heating step range from about 90° C. to about 190° C.

By a suitable modification of the above procedures, it is apparent that any of the compounds disclosed under the generic formula set forth above can be prepared. For example, 2-t-octyl-4-ethoxyphenol can be reacted in accordance with the procedure set forth in Examples 5 and 6 to give 2-t-octyl-4-ethoxy-6-(1-propenyl) phenol. Other compounds such as 2-ethyl-4-methoxy-6-(1-propenyl) phenol can be similarly prepared. As further examples, the isobutenyl, phenyl, biphenyl, etc. analogues of these compounds can also be prepared.

Likewise, the alkyl portion of the alkoxy radical can be a radical other than methyl or ethyl such as propyl, tertiary butyl, hexyl, etc. as described above. Thus, 2-propenyl-4-butoxyphenol (which is abbreviated PBP), 2-propenyl-4-isopropoxyphenol (PIP), 2-allyl-4-butoxyphenol (ABP) and 2-allyl-4-isopropoxyphenol (AIP) have been prepared. The boiling points (B. P.) at reduced pressures (mm. of Hg pressure), and the refractive indexes $N_D^{20}$ have been determined for these compounds as follows:

| Compound | B. P. | Pressure | $N_D^{20}$ |
|---|---|---|---|
| ABP (2-allyl-4-butoxyphenol) | 118–119 | 0.7 | 1.5265 |
| PBP (2-propenyl-4-butoxyphenol) | 122–124 | 0.5 | 1.5497 |
| AIP (2-allyl-4-isopropoxyphenol) | 94– 95 | 0.5 | 1.5295 |
| PIP (2-propenyl-4-isopropoxyphenol) | 102–104 | 0.4 | 1.5545 |

The comparative antioxidant properties of these compounds are omitted from the table presented further on in this specification which deals only with propenyl derivatives of p-hydroxyanisole (viz. 4-methoxyphenol) in order to avoid presenting an unduly complex array of data therein. However, a brief tabulation relating to other propenyl derivatives wherein the alkoxy group is not methoxy is presented here. This data is based on tests using an antioxidant concentration of 0.02% by weight in lard having an AOM value of 11.5 hours (AOM is defined hereinbelow). The protection factors (P. F.) are presented beneath the abbreviation for the antioxidant. The letters BHA, AHA, and PHA are defined hereinbelow as particular butyl, allyl and propenyl derivatives of p-hydroxyanisole:

| Antioxidant | BHA | AHA | ABP | AIP | PHA | PBP | PIP |
|---|---|---|---|---|---|---|---|
| P. F. | 2.3 | 1.7 | 1.8 | 1.8 | 3.9 | 3.9 | 3.2 |

From this data it can be seen that the propenyl derivatives of p-alkoxyphenols are clearly superior to the corresponding allyl derivatives which are of about the same degree of effectiveness as the well known antioxidant BHA.

The propenyl derivatives of p-alkoxyphenols which have been described above are quite useful as antioxidants for fats and oils as has been indicated. When so employed, fractions of a percent of such compounds can be incorporated into such materials as lard, cottonseed oil, peanut oil, etc., by admixing the propenyl derivatives of p-alkoxyphenols with the fats or oils whereby a solution of the antioxidant in the substrate is obtained. Alternatively, the antioxidant can be blended with suitable solvents to form an antioxidant solution. Examples of such solvents include glycerin and propylene glycol. Such antioxidant solutions can be more readily dissolved in the fat or oil to be stabilized with less necessity for prolonged mixing of the fat or oil with the undissolved antioxidant. Similarly, synergists can be admixed with the fats or oils along with the dry antioxidant compounds of this invention or, in order to facilitate the incorporation of the antioxidant and synergist into the fat or oil, they can both be dissolved in such solvents as hexane, propylene glycol, glycerin, or other similar solvents which are inert insofar as concerns both the antioxidant and/or the synergist components in the ultimately prepared stabilized fat or oil. As a further illustration of the remarkable utility of the compounds of this invention, it can be noted that some of them are liquids at ordinary temperatures such as 2-(1-propenyl)-4-methoxyphenol which can be used without any solvent and in some cases, it is quite advantageous to use this compound without any such diluent. However, if a diluent is desired, this compound is soluble in solvents such as propylene glycol in all proportions.

Examples of synergists which can be employed include citric acid, tartaric acid, phosphoric acid, ascorbic acid, etc. In addition to the presence of a single propenyl derivative of p-alkoxyphenols in the above antioxidant compositions, two or more such derivatives can be simultaneously employed in such compositions and/or other antioxidants can be added for their supplemental effects if such be desired.

In addition to the fats and oils mentioned above which can be stabilized by the antioxidants of our invention, other representative fats and oils include linseed oil, menhaden oil, cod liver oil, castor oil, olive oil, rape seed oil, cocoanut oil, palm oil, corn oil, sesame oil, peanut oil, babassu oil, butter fat, lard, beef tallow, etc., as well as hydrogenated oils and fats prepared from any of the foregoing. Furthermore various other oils and fats may be similarly treated within the scope of the present invention.

Inasmuch as it is well known in the art to employ antioxidants in the stabilization of fats and oils, it is not believed necessary to give numerous specific examples of how the antioxidants of this invention are blended with fats and oils nor the specific proportions which can be employed. The methods of blending antioxidants and synergists with particular fats and oils can be readily determined by those skilled in the art. The range of antioxidant proportions which can be employed is from about 0.001 percent up to as much as 1.0 percent or more by weight of the antioxidants of this invention depending upon the effects desired. Generally, a range of proportions of from about 0.001 percent to about 0.1 percent is advantageous with the upper limit being usually fully satisfactory if it does not exceed 0.05 percent. When solvents are employed in preparing antioxidant solutions, such solvents can be present in an amount just sufficient to dissolve the antioxidant up to any larger amount which may be desired, especially if larger amounts are necessary to fully dissolve other supplementary antioxidants and/or synergists which may be incorporated into the antioxidant solution.

The following tabulation and data is presented in order to show the properties of some of the propenyl derivatives of p-hydroxyanisole such as propenyl-p-hydroxyanisole (PHA—Formula I above), dipropenyl-p-hydroxyanisole (DPHA—Formula II above), t-butyl-propenyl-p-hydroxyanisole (BPHA—Formula III above), and allyl-propenyl-p-hydroxyanisole (APHA—Formula IV above). Data for the closely related allyl derivatives containing no propenyl substituent are also presented, viz. 2-allyl-4-methoxyphenol which can also be called m-allyl-p-hydroxyanisole (AHA), 2,6-diallyl-4-methoxyphenol which can be loosely termed diallyl-p-hydroxyanisole (DAHA), and 6-allyl-2-t-butyl-4-methoxyphenol which can be loosely termed t-butyl-allyl-p-hydroxyanisole (BAHA). Furthermore, the properties of the well known antioxidant, 2-t-butyl-4-hydroxyphenol otherwise known as butylated hydroxyanisole (BHA), are also set forth as illustrating the comparative superiority of the antioxidants of this invention insofar as concerns their employment in the substrates being stabilized during the tests whose results are tabulated:

COMPARATIVE ANTIOXIDANT PROPERTIES

| Antioxidant and Synergist | Lard | | | | | | | | Cottonseed Oil | | Peanut Oil | |
|---|---|---|---|---|---|---|---|---|---|---|---|---|
| | A | | B | | C | | Average, P. F. | | | | | |
| | AOM | P. F. | AOM | P. F. | AOM | P. F. | | | AOM | P. F. | AOM | P. F. |
| Control | 3.5 | 1.0 | 4.5 | 1.0 | 6.5 | 1.0 | 1.0 | | 11.5 | 1.0 | 15.0 | 1.0 |
| Concentration of 0.1% of: | | | | | | | | | | | | |
| DPHA | 24.0 | 6.8 | | | | | 6.8 | | 15.0 | 1.3 | 21.5 | 1.4 |
| PHA | 13.5 | 3.9 | 26.0 | 5.8 | | | 4.9 | | 11.0 | 1.0 | 14.0 | 1.0 |
| BHA | 9.0 | 2.6 | 15.5 | 3.4 | | | 3.0 | | | | | |
| DAHA | 11.0 | 3.2 | | | | | 3.2 | | 9.5 | 0.8 | 15.5 | 1.0 |
| AHA | | | 11.0 | 2.4 | | | 2.4 | | | | | |
| Concentration of 0.005% citric acid and 0.01% of: | | | | | | | | | | | | |
| DPHA | 24.0 | 6.8 | | | | | 6.8 | | 14.0 | 1.2 | 30.0 | 2.0 |
| PHA | 13.5 | 3.9 | | | | | 3.9 | | | | 19.0 | 1.3 |
| BHA | 9.0 | 2.6 | | | | | 2.6 | | | | | |
| DAHA | | | | | | | | | 8.5 | 0.7 | 19.0 | 1.3 |
| Concentration of 0.02% of: | | | | | | | | | | | | |
| DPHA | 39.5 | 11.3 | | | 72.0 | 11.1 | 11.2 | | 18.0 | 1.6 | 30.0 | 2.0 |
| BPHA | | | | | 61.0 | 9.4 | 9.4 | | | | | |
| APHA | | | | | 58.0 | 8.9 | 8.9 | | | | | |
| PHA | 19.0 | 5.4 | 33.0 | 7.6 | | | 6.5 | | 11.5 | 1.0 | 14.0 | 1.0 |
| BAHA | | | | | 34.0 | 5.2 | 5.2 | | | | | |
| BHA | 9.0 | 2.6 | 16.0 | 3.6 | 27.5 | 4.2 | 3.5 | | 9.5 | 0.8 | 16.0 | 1.1 |
| DAHA | 12.0 | 3.5 | | | | | 3.5 | | 8.5 | 0.7 | 15.5 | 1.0 |
| AHA | | | 10.0 | 2.2 | | | 2.2 | | | | | |

The data presented above is based on tests conducted with three samples of lard, identified as A, B, and C and one sample of each of the oils in the table. The AOM figures are in hours; the symbol P. F. represents the protection factor which is the ratio of the AOM value of the stabilized substrate to that of the control which contains no antioxidant. The procedure employed under the AOM (active oxygen method) is well known in the antioxidant art and need not be explained in this specification. Some of the data presented above includes the effect of a synergist together with the primary antioxidant. Citric acid has been selected as a typical synergist. All percentages are by weight.

The above data clearly shows that dipropenyl-p-hydroxyanisole (DPHA) possesses markedly superior antioxidant properties in lard when compared to known antioxidants such as butylated hydroxyanisole (BHA); this, coupled with its order of toxic tolerability, makes the advantage of DPHA quite apparent. The average P. F. values given in the table for lard show the order of decreasing effectiveness of the various antioxidants of this invention. Diallyl-p-hydroxyanisole (DAHA) and t-butyl-allyl-p-hydroxyanisole (BAHA) which are believed to be new compounds are also equal to or superior to BHA but inferior to the compounds of this invention, viz. propenyl derivatives of p-alkoxyphenols. The employment of citric acid as a synergist is only effective in peanut oil insofar as the oils and fats tested disclose; however, other antioxidants than those disclosed could also be added to the substrates covered in these tests whereupon the citric acid (or some other synergist) would bring about an increased effect greater than that of the supplementary antioxidant by itself; such other antioxidants could include propyl gallate or other alkyl gallates for example. Of the antioxidants of this invention, the data presented shows that those compounds of the above defined generic formula are most effective where $R_2$ is a radical instead of a hydrogen atom; of these, the most effective is that compound where $R_2$ is a 1-propenyl radical, viz, dipropenyl-p-hydroxyanisole (DPHA).

In addition to the employment of propenyl derivatives of p-hydroxyanisole in the stabilization of fats and oils, these compounds can be employed as antioxidants, preservatives, stabilizers, or deterioration retarders for other purposes of similar nature, such as for the stabilization of synthetic resins, for the retardation of deterioration of petroleum hydrocarbons such as gasoline, for the stabilization of pyrethrums, etc.

The compounds of our invention are of considerable practical value in the antioxidant field as regards edible fats and oils inasmuch as they are insoluble in water but are soluble in petroleum solvents and in fats and oils. The solubility of these compounds in fats and oils and their insolubility in water results in the antioxidant compounds of our invention having excellent carry-over properties. In other words, the blending, cooking, baking, or other processing operations performed in the combining and cooking of food products has very little effect on the antioxidants of this invention. The antioxidants are therefore capable of performing a substantial antioxidant function in the baked, fried, or otherwise cooked product, thereby giving such a product improved shelf life. As regards such carry-over properties into the cooked foods, those antioxidants of this invention set forth in the general formula above wherein R is other than a hydrogen atom are of greater value that propenyl-p-hydroxyanisole. However, even propenyl-p-hydroxyanisole has the equivalent solubility and consequently the equivalent carry-over properties of 2-t-butyl-4-methoxyphenol which is the most active constituent of commercial antioxidants called butylated hydroxyanisole. Furthermore, many of these compounds including propenyl-p-hydroxyanisole are comparatively non-toxic, for example, propenyl-p-hydroxyanisole is in the same range of toxicity as the presently approved food antioxidants called butylated hydroxyanisoles. It is accordingly believed that the compounds of this invention will find ready acceptance in the field of preservation of foods for which they are so eminently suited.

We claim:

1. Propenyl derivatives of p-alkoxyphenols having the following formula:

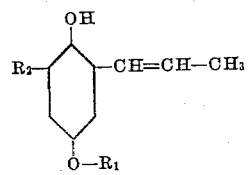

wherein $R_1$ represents a member selected from the group consisting of alkyl radicals containing from 1 to 8 carbon atoms and $R_2$ represents a member selected from the group consisting of a hydrogen atom, alkyl radicals containing from 1 to 8 carbon atoms, alkenyl radicals containing from 3 to 8 carbon atoms and aryl radicals of the benzene series containing from 6 to 12 carbon atoms.

2. Propenyl-p-hydroxyanisole having the following formula:

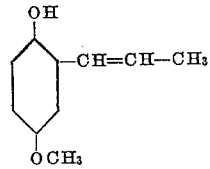

3. Dipropenyl-p-hydroxyanisole having the following formula:

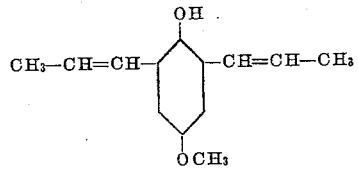

4. Tertiary-butyl-propenyl-p-hydroxyanisole having the following formula:

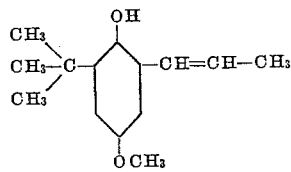

5. Allyl-propenyl-p-hydroxyanisole having the following formula:

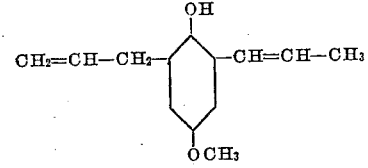

6. A process for preparing 1-propenyl derivatives of p-alkoxyphenols as defined in claim 1 which comprises heating a starting material having the following formula:

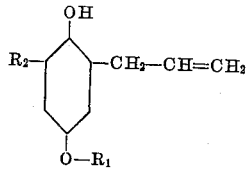

wherein R₁ represents a member selected from the group consisting of alkyl radicals containing from 1 to 8 carbon atoms and R₂ represents a member selected from the group consisting of a hydrogen atom, alkyl radicals containing from 1 to 8 carbon atoms, alkenyl radicals containing from 3 to 8 carbon atoms and aryl radicals of the benzene series containing from 6 to 12 carbon atoms, in the presence of an alkali metal hydroxide solution in an inert medium under an inert atmosphere at a temperature of from about 90° to about 190° C. whereby a product is produced wherein the allyl radicals present in the starting material have been isomerized to form 1-propenyl radicals.

7. A process for preparing the compound defined in claim 2 which comprises heating 2-allyl-4-methoxyphenol in the presence of an aqueous potassium hydroxide solution under an atmosphere of nitrogen at a temperature of from about 90° to about 190° C.

8. A process for preparing the compound defined in claim 3 which comprises heating 2,6-diallyl-4-methoxyphenol in the presence of an aqueous sodium hydroxide solution under an atmosphere of nitrogen at a temperature of from 90° to 190° C.

9. Stabilized fats and oils containing from about 0.001% to about 1.0% by weight of a propenyl derivative of p-hydroxyanisole as defined in claim 1.

10. Stabilized fats and oils containing from about 0.001% to about 0.1% by weight of propenyl-p-hydroxyanisole as defined in claim 2.

11. Stabilized lard containing from about 0.001% to about 0.1% by weight of propenyl-p-hydroxyanisole as defined in claim 2.

12. Stabilized fats and oils containing from about 0.001% to about 0.1% by weight of dipropenyl-p-hydroxyanisole as defined in claim 3.

13. Stabilized lard containing from about 0.001% to about 0.1% by weight of dipropenyl-p-hydroxyanisole as defined in claim 3.

14. Stabilized fats and oils containing from about 0.001% to about 0.1% by weight of t-butyl-propenyl-p-hydroxyanisole as defined in claim 4.

15. Stabilized fats and oils containing from about 0.001% to about 0.1% by weight of allyl-propenyl-p-hydroxyanisole as defined in claim 5.

16. A process for stabilizing fats and oils which comprises adding thereto from about 0.001% to about 0.1% by weight of a propenyl derivative of p-hydroxyanisole as defined in claim 1.

17. A process for stabilizing fats and oils which comprises adding thereto from about 0.001% to about 0.1% by weight of propenyl-p-hydroxyanisole as defined in claim 2.

18. A process for stabilizing fats and oils which comprises adding thereto from about 0.001% to about 0.1% by weight of dipropenyl-p-hydroxyanisole as defined in claim 3.

19. A process for stabilizing lard which comprises adding thereto from about 0.001% to about 0.1% by weight of dipropenyl-p-hydroxyanisole as defined in claim 3.

References Cited in the file of this patent

UNITED STATES PATENTS

| Number | Name | Date |
|---|---|---|
| 1,704,494 | Boedecker | Mar. 5, 1929 |
| 1,787,036 | Ehrlich | Dec. 30, 1930 |
| 1,792,716 | Stockelbach | Feb. 17, 1931 |
| 2,064,610 | Hunt | Dec. 15, 1936 |
| 2,296,363 | Messer | Sept. 22, 1942 |
| Re. 23,239 | Rosenwald et al. | June 6, 1950 |

FOREIGN PATENTS

| Number | Country | Date |
|---|---|---|
| 119,253 | Germany | Mar. 19, 1901 |
| 934,955 | France | June 7, 1948 |

OTHER REFERENCES

Fletcher et al.: Journal Am. Chem. Soc. 65, pp. 1431-2; July 1943.